MEANS FOR TRANSMITTING PICTORIAL INFORMATION OVER TELEPHONE LINES

Filed Jan. 30, 1967 2 Sheets-Sheet 1

INVENTORS
JOHN C. BUTTERWORTH
HORACE S. ALLEN
RYNOR L. STRATTON
BY Charles B. Haverstock
ATTORNEY INVENTORS
JOHN C. BUTTERWORTH
HORACE S. ALLEN
RYNOR L. STRATTON
BY Charles B. Haverstock
ATTORNEY

United States Patent Office 3,526,709

Patented Sept. 1, 1970

3,526,709

MEANS FOR TRANSMITTING PICTORIAL INFORMATION OVER TELEPHONE LINES

John C. Butterworth, Overland, Horace S. Allen, St. Louis, and Rynor L. Stratton, Dellwood, Mo., assignors, by mesne assignments, to McDonnell Douglas Corporation, St. Louis County, Mo., a corporation of Maryland

Filed Jan. 30, 1967, Ser. No. 612,613
Int. Cl. H04m *11/08;* H04n *1/02, 1/36*
U.S. Cl. 178—6.8 5 Claims

ABSTRACT OF THE DISCLOSURE

A device for use with existing telephone equipment including means for sending audible information signals representing a pictorial image to be transmited from a telephone set over a telephone line and means for receiving such audible signals sent by other similar devices associated with other telephones including means to reproduce a transmitted pictorial image from said audible signals.

The present invention relates generally to information transmiting and receiving means and more particularly to means for transmiting and reeciving pictorial images over telephone lines using existing telephone equipment.

There is a growing need to be able to economically and expeditiously send and receive pictorial images such as images stored on microfilm and the like between remote locations. In particular there is a need to be able to send and receive images over telephone lines using existing telephone equipment. Many attempts have been made to satisfy this need but for various reasons all of the known attempts have been unsuccessful. For example, no known device has been able to operate using existing telephone equipment without very substantially modifying the telephone equipment, and all known means have been difficult and time consuming to operate, expensive and cumbersome to construct, and the quality of reproduction has been relatively poor. The present invention teaches the construction and operation of a novel compact device capable of being used to send and receive signals representing pictorial information over the existing telephone lines. The subject means are also relatively inexpensive to construct, economical to operate, and can be operated by persons having little skill and training.

It is therefore a principal object of the present invention to provide relatively inexpensive means for sending and receiving images between any two or more telephone sets using existing telephone equipment.

Another object is to provide economical means for sending and receiving pictorial information.

Another object is to make printed and pictorial material more universally available.

Another object is to provide means for accurately transmitting, receiving and reproducing pictorial information including information on microfilm and the like.

Another object is to provide means by which pictorial information can be sent and received between remote locations by persons having relatively little skill or training.

Another object is to provide a relatively compact, lightweight, portable instrument operable in conjunction with existing telephone equipment including telephone lines and capable of transmitting and receiving between communicating telephones signals representing pictorial information as to an image to be transmitted and including means to photographically reproduce the transmitted image from the said signals.

Another object is to provide means for previewing a pictorial image before sending it to verify that the correct images are being sent and that the sending equipment is operating properly.

These and other objects and advantages of the present invention will become apparent after considering the following detailed specification which discloses a preferred embodiment of the subject device in conjunction with the accompanying drawings wherein.

Figures 1, 2:
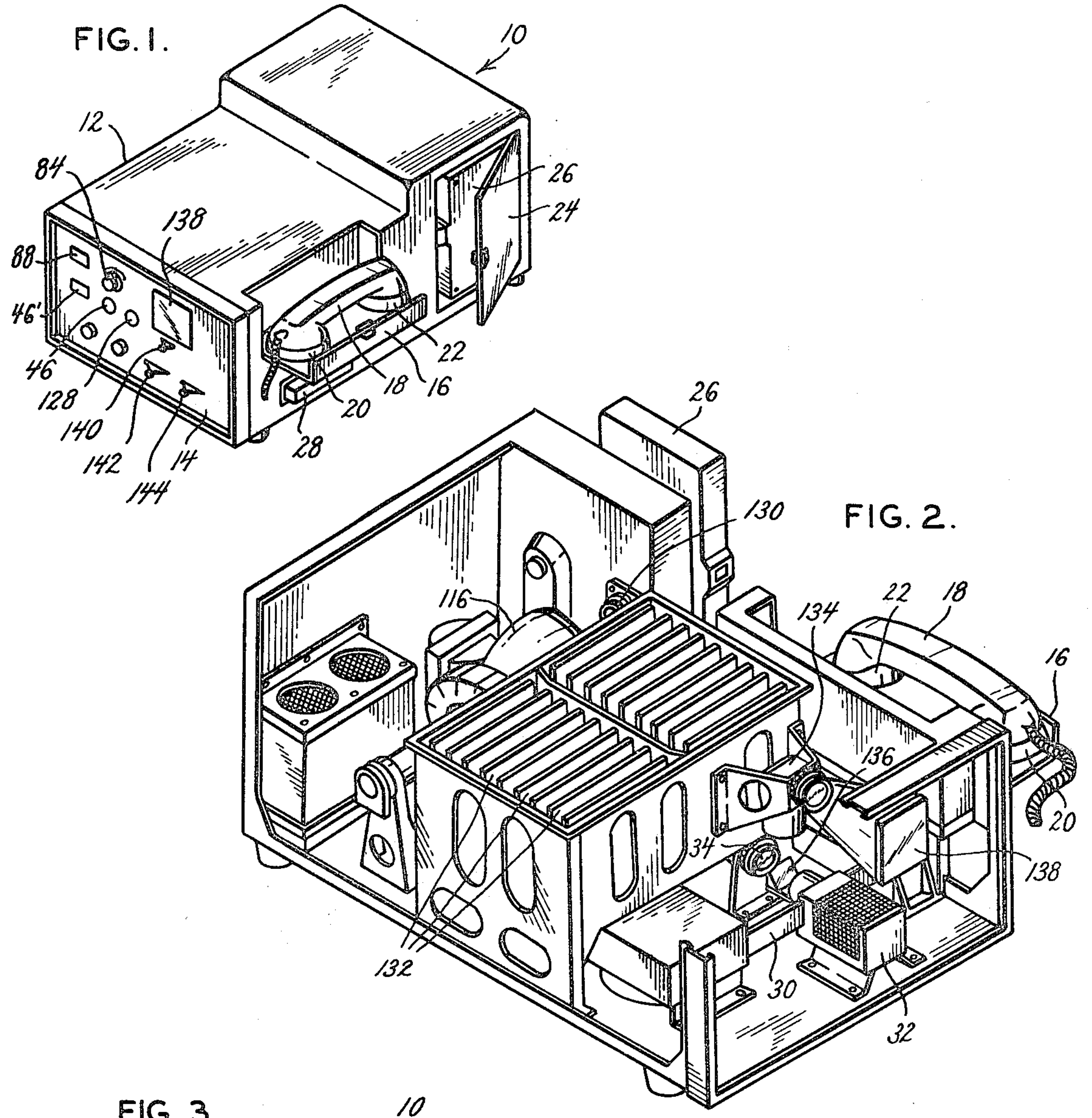
FIG. 1 is a perspective view of a device constructed according to the present invention.
FIG. 2 is a perspective view of the same device with the covers removed exposing the principal components thereof.

Referring to the drawings more particularly by reference numbers, number 10 refers generally to a device for use with existing telephone equipment, and constructed to transmit and receive signals representing photographic images between communicating telephone sets. The device 10 includes a housing 12 with a control panel 14 at one end. The housing has a cradle 16 on one side on which a telephone headset 18 of conventional construction is positioned during operation of the subject device. The telephone headset 18 includes a mouthpiece or microphone portion 20 and a listing or earphone portion 22.

A door 24 is provided in the side of the housing 12 at the location shown and opens into a chamber which receives a microfilm cartridge such as the cartridge 26 shown in FIGS. 1 and 2. The carriage 26 contains a film strip on which images transmitted by similar remote sets can be recorded photographically. Many types of microfilm cartridges are commercially available and the present device can be designed and constructed to operate with almost any of them.

The subject device also includes a film magazine 28 in which films having images on them can be placed for transmitting selected images to other remote sets. A film strip positioned in the film magazine 28 can be moved along a channel 30 in front of a projector assembly 32 which includes a lamp housing and a prism assembly. The image projected by the projector 32 is focused by a lens assembly 34 onto the face of a vidicon, orthicon, or similar type tube 36. The images focused on a tube are scanned in a predetermined way and at a predetermined scan rate by means which will be described later. As the image is scanned signals are produced having characteristics which correspond to the characteristics of the portions of the image that are being scanned. These are video signals and together with other signals which represent how the tube is controlled during scanning are used to audio modulate a carrier signal or frequency which is then presented to the microphone portion 20 of the telephone headset 18 when the headset is positioned in the cradle 16 as shown in FIG. 1. The telephone, operating in its usual way, transmits these audio modulated signals to other telephones in communication therewith. The earphones of the other communicating phones respond to the audio modulated signals that are received and feed them to the receiver portions of associated units 10 which include means for reproducing therefrom the images that are being transmitted.

Figure 5:
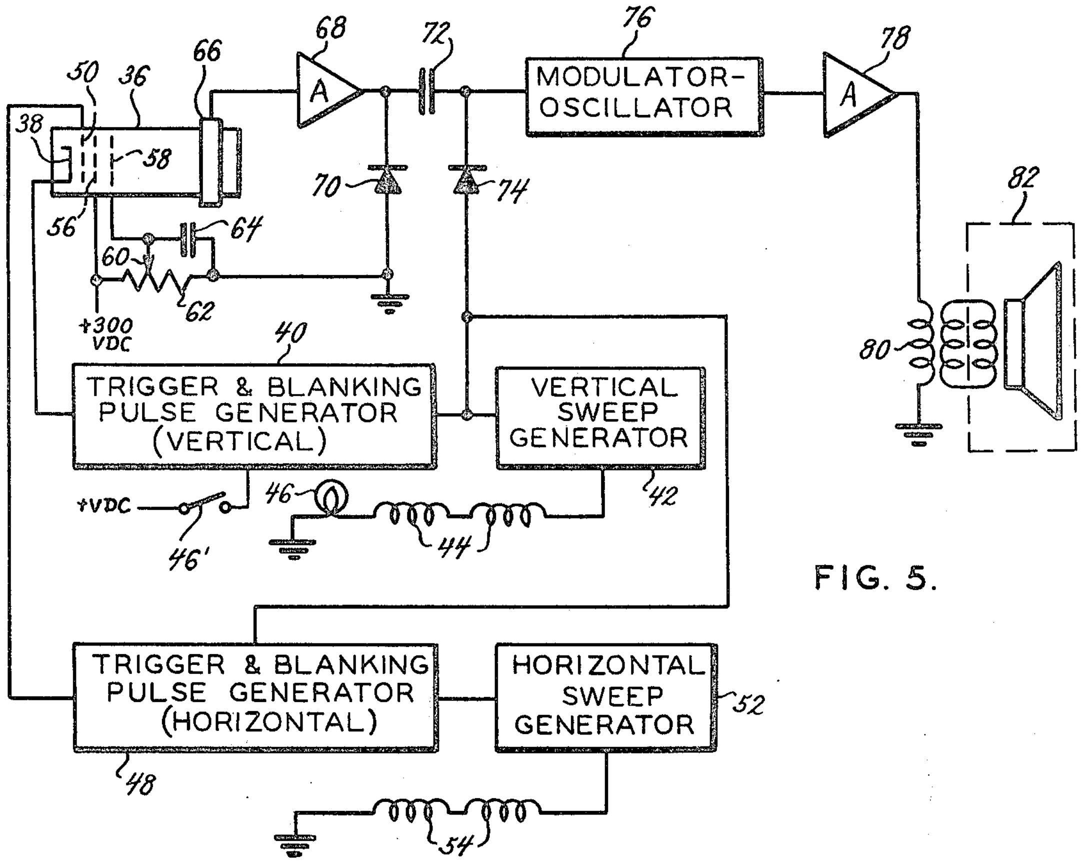
FIG. 5 is a schematic circuit diagram partly in block form of the transmitter portion of the subject device.

The transmitting portions of the circuit for the subject device is shown in FIG. 5, and includes means for scanning the image projected onto the vidicon tube 36 and means for producing the video signals that are used to audio modulate the carrier for transmission. During the scanning of an image signals are produced which correspond to the video characteristics of the image, as aforesaid, and these are also applied to or combined with a carrier signal within a frequency bandwidth that is capable of being transmitted over a telephone line. It is recognized that existing telephone equipment and telephone lines are limited as to the frequency spectrum or bandwidth they are capable of handling without producing excessive distortion, and for this reason it is usually necessary to limit the operation of the subject device to a modulation bandwidth that is within a relatively precisely defined frequency range. For example, most existing telephone equipment is limited to a bandwidth of approximately 5 kilocycles without producing excessive distortion. This frequency spectrum or bandwidth may be exceeded but if it is the fidelity of reproduction may be impaired.

The scanning control means at the transmitting unit include means which control the number and length of horizontal scan lines required to cover the image area, the spacing of the scan lines, and the scanning rate. The scan control means also include means for controlling the vertical scanning rate. The audio modulation applied to the carrier which represents the scanning controls is used by the receiving units to construct a scanning raster that is similar to the scanning pattern used by the transmitting unit.

In a typical situation in which an image on an 8½ x 11 inch document is to be transmitted using the subject device, a transmitting time of approximately 4.6 minutes is required. This time represents the time required to scan the image on the vidicon tube using a horizontal scan rate of approximately 250 milliseconds or a quarter of a second per horizontal scan line. Such a scanning rate enables video information to be transmitted within the frequency limitations of conventional telephone equipment. With this scanning rate and with 100 scan lines per inch, which is necessary to provide relatively high quality reproduction, a document 11 inches long will require 1,100 horizontal scan lines or video bits. At this rate and with this number of scan lines, an 11-inch document will require 4.6 minutes to transmit. This is arrived at by multiplying the 1,100 lines by one-fourth second per line. This time can be substantially reduced if a wider bandwidth is available so that a faster scan rate can be used or if some deterioration in quality is not objectionable.

FIG. 5 shows the transmitter portion of the subject device which includes the vidicon tube 36 having its cathode element 38 connected to the output of a trigger and blanking oscillator circuit 40. The oscillator circuit 40 is constructed to produce output pulses having a pulse width of approximately 4 milliseconds and a pulse rate or frequency of approximately .218 pulse per minute. These pulses are applied to the cathode 38 of the vidicon tube and are used for vertical triggering and blanking purposes. The same pulses are also mixed with signals from a vertical sweep generator 42 which are in the form of ramp-type signals adjusted to control the vertical position of the scanning lines and hence also the time required to scan an image from top to bottom. In the case of an 8½ x 11 inch document as noted above, it takes approximately 4.6 minutes for the ramp signal to cover its full range of voltage to represent an 11-inch vertical sweep. The output of the vertical sweep generator 42 is also used to initiate the vertical sweeps and to control the vertical sweep rate. The output signals from the triggered blanking oscillator 40 are also mixed with the video output signal produced in the vidicon tube 36 for vertical synchronizing purpose at the receiver.

Figure 3:
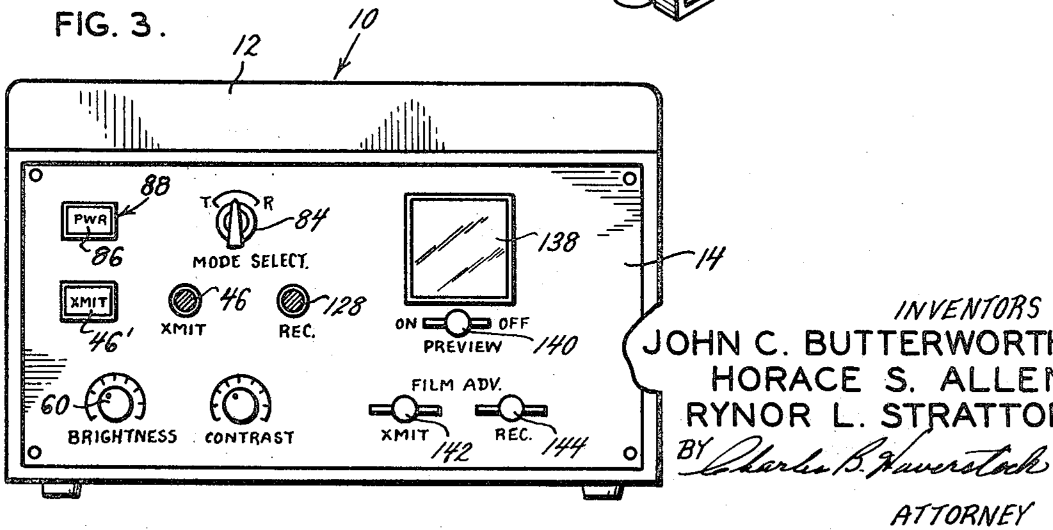
FIG. 3 is a view of the control panel for the subject device.

The vertical sweep generator 42 is shown connected in series with a pair of vertical deflection coils 44 which are parts of the vertical yoke structure of the vidicon tube 36, and are used to control the vertical position and movement of the horizontal sweep during a scanning operation. An indicator light 46 is connected in series with the yoke coils 44, and is energized whenever the coils 44 are energized to indicate to the operator that a transmission is taking place. The position on the control panel of the transmit indicator bulb 46 is shown in FIG. 3.

Another pulse generator 48 is included in the transmit circuit and is used to produce horizontal triggering and blanking pulses. These pulses have a pulse width of approximately 400 microseconds in the case described and at a pulse rate frequency of approximately 4 cycles per second. The pulses produced by the generator 48 are also mixed with the video output signals of the vidicon tube 36 and are used for controlling the horizontal synchronization at the receiver. These signals are applied to the control grid 50 of the vidicon tube 36 which uses them for horizontal blanking purposes and to initiate the operation of an horizontal sweep generator circuit 52. The generator circuit 52 is connected in series with a pair of horizontal deflection coils 54 which are in the horizontal yoke assembly of the vidicon tube 36.

The vidicon tube 36 as shown in FIG. 5, in addition to having the cathode element 38 and the control grid element 50, includes a positively biased grid 56 which is shown connected to a 300 volt D.C. positive supply voltage, and an adjustably biased grid 58 which is connected to a movable contact 60 of potentiometer 62. One side of the potentiometer 62 is connected to a positive voltage source, and the opposite side is grounded. A capacitor 64 is also connected between the grid 58 and ground to stabilize the voltage applied to the grid 58. The potentiometer 62 is used to adjust the brightness of the image on the tube 36.

The video images produced during scanning are produced by image responsive means 66 coupled to the vidicon tube 36. The video signals produced by the means 66 are fed as inputs to an amplifier circuit 68. The outputs of the amplifier 68 are fed to a limiter circuit which includes a grounded diode or rectifier 70 and a capacitor 72 connected as shown. The outputs of the limiter circuit are mixed with the outputs from the vertical triggering and blanking pulse oscillator circuit 40 and the horizontal triggering and blanking pulse generator circuit 48 which outputs are fed through a sync clipper element shown as diode or rectifier 74. These combined signals are applied to the input of modulator-oscillator circuit 76 and are used to audio modulate a carrier signal produced by the oscillator portion of the circuit 76. The outputs of the circuit 76 are then amplified by amplifier circuit 78 and applied across input coil 80 of speaker assembly 82. The speaker assembly 82 produces audible output signals adjacent to the mouthpiece portion 20 of the telephone headset 18 much the same as when a person speaks into the mouthpiece of a telephone, and these audible signals are listened to by the receiver means of the receiving phone. The listening means at the receiving phone include means which respond to the audible signals and produce signals which are used to reproduce the images that they represent.

In the preferred form of the subject device the circuit 76 is constructed to use positive modulation because positive modulation provides superior synchronization in the presence of impulse noise. This is so because the downward noise peaks are clipped at the zero carrier level, and therefore do not adversely affect the synchronizing pulses.

The selection of a vidicon tube for use in the present device has several advantages not the least of which is the ready availability of such devices and the fact that they are relatively inexpensive. Vidicon tubes are also available in different sizes and can be constructed in relatively small sizes so that they can be accommodated in a relative compact portable housing, and the subject device can use common film sizes including 8, 16 and 35 millimeter film and commercially available camera and optical devices and systems.

Figure 4:
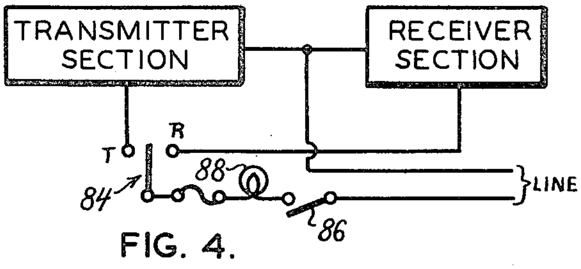
FIG. 4 is a schematic block diagram of the subject device.

Referring to FIGS. 3 and 4, it can be seen that during transmitting of an image, mode selector switch 84 on the control panel 14 is moved from its neutral inoperative position to its transmit (T) position in which it establishes a circuit to provide power to the transmit circuit shown in FIG. 5. In FIG. 4 the switch 84 is shown connected in series with the main power switch 86, and an indicator light 88 is also in this circuit and is energized whenever the switches 84 and 86 are both closed. The main power switch 86 and the indicator light 88 may be part of an assembly mounted on the control panel. The indicator light 88 is also energized when the switch 84 is moved to its receive position (R).

Figure 6:
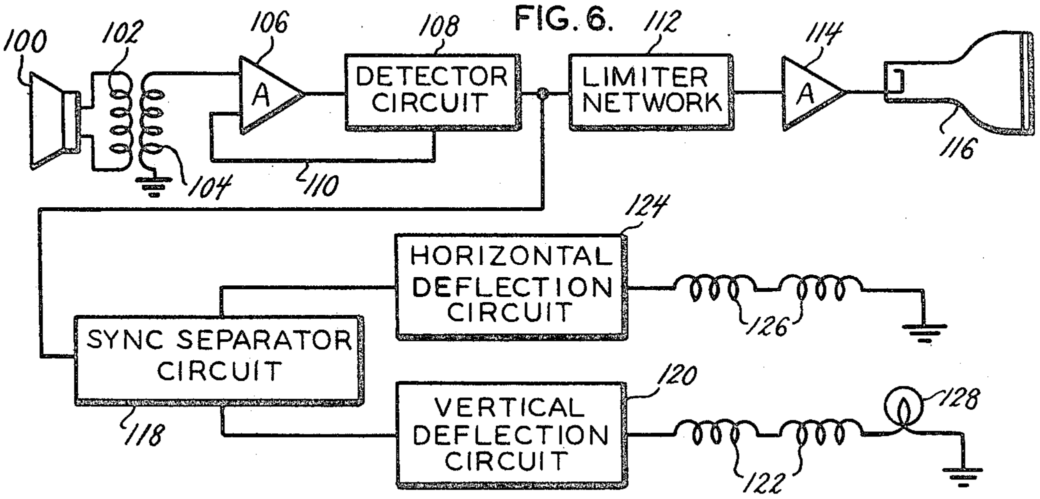
FIG. 6 is a schematic circuit diagram partly in block form of the receiver portion of the subject device.

FIG. 6 shows the receiver portion of the subject device which is included in the same housing. The receiver circuit receives audible input signals from the earphone portion 22 of a telephone headset 18 when the headset is resting on the cradle 16 and when the headset 18 is in communication with another phone that is sending signals thereto as described above. The signals received at the earphone 22 are sensed by a microphone 100 which is a part thereof and is connected across an input coil 102. A secondary coil 104 is coupled to the input coil 102 and feeds the audio modulated input carrier signals to the input side of an amplifier circuit 106. The amplifier circuit 106 amplifies the inputs and produces outputs which are fed to a detector circuit 108 which operates to remove the 5 kilocycle carrier from the audio modulated envelope in the usual way for a detector. The detector circuit 108 also produces automatic gain control (AGC) feed back signals which are applied to the input side of the amplifier circuit 106 in a well known way. The AGC portion of the circuit is preferably an averaging AGC circuit which has a relatively simple and inexpensive construction and has good impulse noise performance characteristics. The AGC signals fed back to the amplifier circuit 106 are fed on lead 110 and are used to control and stabilize the gain of the amplifier circuit 106.

The output of the detector circuit 108 is connected to a limiter network 112 which removes the synchronizing portions thereof, and the outputs of the limiter network are fed to a display amplifier circuit 114 which produces control outputs therefrom which are applied to the control electrodes of a cathode ray tube 116. Commercially available high resolution cathode ray tubes can be used for the tube 116, and a tube having a face about 5 inches high is a good choice from the standpoint of size and ability to reproduce relatively high quality images.

The video output signals of the detector circuit 108, before the synchronism portions thereof have been removed, are also applied to a synchronization separator circuit 118 which includes means to separate the horizontal and vertical synchronizing information from the video information. This is accomplished in the circuit 118 by amplitude clipping involving differentiation and integration of the synchronizing signals. The vertical sync information that is separated out is then fed to a vertical deflection circuit 120 which applies the outputs to vertical yoke coils or plates 122 of the cathode ray tube 116, and the horizontal sync information is fed to a horizontal deflection circuit 124 which applies its outputs to horizontal yoke coils or plates 126 of the tube 116. The combined actions of the vertical and horizontal deflection coils produce a scan raster similar to that generated in the transmitter circuit described above in connection with the vidicon tube 36 and the application of the video signals superimposed on the raster reproduce the image that is being transmitted a bit at a time.

A receive indicator light 128 positioned on the control panel is connected in series with the vertical yoke coils 122 and is energized whenever an input signal is received. The location of the indicator bulb 128 on the control panel is shown in FIG. 3.

The signals applied to the deflection coils 122 and 126 also produce the blanking pulses which are used to trigger respective sweep generators included to produce the raster. It can be seen therefore that the transmitter and receiver portions of the present device are similar in that they both scan in the same way, the transmitter including means for modulating the signals it sends to include scan control signals, and the receiver including means to use the scan control signals it receives to reproduce the raster or scan pattern. In this way a transmitted image is reproduced on the face of the cathode tube 116 a line at a time, and the image thus reproduced on the tube can be exposed to a film strip included in suitable camera means at the receiver. It is also possible to include optional means at the receiver whereby the operator at the receiver can view the image as it is reproduced, if desired.

In the construction disclosed, a 16 mm. unexposed microfilm strip is positioned in the cartridge 26, and means including camera lens system 130 are provided to focus the image as it is reproduced onto the unexposed film strip. The film must be exposed to the image for the total time it takes to reproduce the image which in the case discussed above is approximately 4.6 minutes. At the end of this time the film strip will have been exposed to the entire image as it is reproduced a line at a time, and the end of a transmission will be indicated by means at the transmitter which operate to deenergize the light 46. The panel light 128 at the receiver will be deenergized at this same time.

The camera lens system 130 and the film assembly including the film magazine and cartridge can be manually or automatically controlled and it is also possible to use camera means of the Polaroid or of a contact print type, if desired. It is also preferred in constructing the subject device, to use known and available components and circuits in order to reduce the cost and the engineering involved. Integrated and printed circuit boards 132 such as are shown in FIG. 2 are particularly suitable for use in the present device because they conserve space, make the device lightweight, have reliable characteristics, and are relatively maintainance free.

It is usually also desirable to include means for previewing an image before it is transmitted to make sure that it is properly positioned and focused for transmitting and to make sure that the proper subject matter has been selected. This is accomplished by providing a simple magnifying lens system 134 located as shown in FIG. 2, and a suitable mirror or prism assembly 136 located to reflect the image light projected by the projector 32 upwardly. The upwardly projected image enters the lens assembly 134 and is redirected forwardly onto a previewing screen 138 on the control panel 14. In this way, the operator can preview an image before it is transmitted. A preview control switch 140 is provided on the control panel for this purpose, and when the switch 140 is moved to its "on" position it energizes the projector means and moves the prism assembly 136 into position for reflecting the image received from the projector upwardly. Means are also included for moving the film strip in the channel 30 to properly locate it relative to the projector. This is accomplished by the two switches 142 and 144 on the control panel. The switch 142 is used for transmitting and has two operating positions labelled F and R for forward and reverse film movement. The switch 144 is used when receiving and also has forward and reverse film moving positions.

The present device has many applications including any application where it is desired to transmit a video image such as an image contained on a microfilm or other device from one location to another. It is also possible with slight modification using the same basic structure to transmit images of objects or hard copies of documents omitting the need for a film magazine altogether. This would require modification so that the vidicon tube could be exposed to the object or copy instead of to a film. It is also apparent that the quality of the received images can be increased or decreased by increasing or decreasing the scanning time or changing the frequency bandwidth over which the signals are being sent.

Thus there has been shown and described novel means for transmitting and receiving photographic images such as images on microfilm and other images which fulfills all of the objects and advantages sought therefor. Many changes, modifications, variations and other uses and applications of the subject device will, however, become apparent to those skilled in the art after considering this specification and the accompanying drawings. All such changes, modifications, variations and other uses and applications of the subject device, which do not depart from the spirit and scope of the invention, are deemed to be covered by the invention which is limited only by the claims which follow.

What is claimed is:

1. Means for sending audible signals between communicating telephones over a telephone line or like device, said audible signals representing a visible image to be transmitted and received between the communicating telephones comprising similar transmitter-receiver means each operating in conjunction with a conventional telephone handset having a mouthpiece and an earphone, other means at the location of each communicating telephone for audibly communicating the handsets including means for audibly exciting the mouthpiece at the transmitting telephone and means at the receiving handset responsive to the audible excitations received at its earphone, a member at one of said transmitter-receiver means having a light sensitive surface, means for projecting an image to be transmitted onto said surface, means sensitive to the light at a predetermined spot on said surface, said last named means including means for producing a video signal having characteristics corresponding to the image light sensed at said predetermined spot, means for controlling the light sensitive means to cause said light sensitive means to scan the light sensitive surface on which the image is projected to produce a video signal which varies with the characteristics of the image as it is being scanned, means at said one of said transmitter-receiver means for producing a carrier frequency signal, means using said video signal to audibly modulate the carrier frequency signal, means at said one transmitter-receiver means to further audibly modulate the carrier with information representing the path followed by the light sensitive means in scanning the image surface, speaker means excitable by said audibly modulated carrier signal for exciting the mouthpiece of the telephone handset at the location of said one transmitter-receiver, means including the earphone portion of the telephone handset at the location of the receiving transmitter-receiver means for responding to receipt thereat of the audio modulated carrier signal, said last named means including electro-optical means, and means for exciting said electro-optical means by the signals received at the earphone portion to reproduce the visible image represented by the audio modulated carrier signal, and image viewing means including means for projecting an image to be transmitted over a telephone line onto the viewing means, said image projecting means including means to focus and orient an image before it is transmitted.

2. The means defined in claim 1 wherein said member having a light sensitive surface includes a vidicon tube.

3. Means for reproducing an image from a signal audio modulated with video and control signals to represent said image, said signal being transmitted over a telephone link using conventional telephone handsets as parts of the link between the communicating telephones comprising means at the location of one of the communicating telephones for producing an audio modulated signal to be transmitted and means for exciting the mouthpiece portion of the telephone thereat by said audio modulated signal, earphone means at the receiving telephone, and means positioned adjacent to the earphone means to respond to said audio modulated image signals received thereat, circuit means having an input connected to the means adjacent to the earphone means at the receiving telephone, said circuit means including means for demodulating the signals received at the earphone means, means including a cathode ray tube having a light producing surface thereon, means in said tube for directing a particle beam against said surface to produce a visible image at the point where the beam impinges on the surface, means including said circuit means connected to the tube to deflect the particle beam to cause it to scan the light producing surface thereof, said circuit means also including other means connected to the tube to modulate the particle beam by the demodulated video output of the circuit means during scanning of the tube surface to video modulate the particle beam during scanning thereof to reproduce the image represented thereby, photographic means including film means positioned to be exposed to said tube surface and to the image reproduced thereon to photographically record the image as it is reproduced on the tube surface by the modulated particle beam, and means for amplifying the audio modulated image signals received at the earphone of the receiving telephone including means for automatically controlling the gain of said amplifying means.

4. Means for sending and receiving images between conventional communicating telephone sets each having a mouthpiece and an earphone comprising similar transmitter-receiver units located adjacent to each of the communicating telephone sets, said units each including means for cooperating with the mouthpiece and earphone of the telephone set associated therewith, each unit being selectively operable to send or receive audio modulated signals from one telephone set to another using the mouthpiece of the telephone set at the transmitting unit and the earphone of the telephone set at the receiving unit as parts of the communication link therebetween, the audio modulated signals including modulation information from which an image can be reproduced, each of said units including means for positioning an image to be transmitted, a member having an image sensitive surface thereon, means for projecting the image to be sent onto said surface, means sensitive to the video characteristics of the projected image at a predetermined location on the said surface, means for deflecting the image sensitive means to cause it to scan the surface in a preselected manner, said image sensitive means including means for producing a signal having characteristics that represent the video characteristics of the image at each instant as the image surface is scanned, means for generating a carrier frequency signal, means to audio modulate said carrier frequency signal by said video modulating signal, other means to audio modulate said carrier frequency signal according to the manner in which an image surface is scanned by the image sensitive means, means exciting the telephone mouthpiece at the unit that is transmitting with said audio modulated carrier; means at the communicating receiving unit including means positioned adjacent to the telephone earphone thereat for responding to the audio modulated signals introduced into the mouthpiece of the transmitting telephone set, means for reproducing from said received signals the image being transmitted by the transmitting unit including means for separating the audio signal modulation representing the video characteristics of the image from the audio modulation representing the scanning information, a cathode ray tube having a light producing surface thereon, means in said tube for projecting a particle beam against said surface to excite the surface to produce light, means in said tube responsive to the audio modulation that represents the scanning information to deflect the particle beam along a path on the light producing surface in a manner to scan said surface in a way similar to the way the light sensitive surface at the transmitting unit is scanned, means for modulating the particle beam during scanning by the signal modulation representing the video characteristics of the image, light sensitive means positioned to be exposed to the image as it is reproduced on the cathode ray tube to photographically record the light produced on the tube surface during scanning thereof, and other means at each transmitting-receiving unit including means for viewing an image before it is transmitted, means for selecting between an image viewing and an image transmitting operation, and means for orienting an image projected onto the light sensitive surface before it is transmitted.

5. The means defined in claim 4 wherein said means for photographically recording the light on the tube surface at the receiving unit include camera means having a film strip therein.

References Cited

UNITED STATES PATENTS

| | | | |
|---|---|---|---|
| 3,392,232 | 7/1968 | Cohen | 178—6.6 |
| 2,903,517 | 9/1959 | Ridings | 179—4 |
| 2,981,791 | 4/1961 | Dixon. | |
| 3,251,937 | 5/1966 | Hoag. | |
| 3,422,218 | 1/1969 | Byer. | |

RICHARD MURRAY, Primary Examiner

H. W. BRITTON, Assistant Examiner

U.S. Cl. X.R.

178—6, 6.7. 69.5; 179—2